Jan. 8, 1946.　　　O. E. ESVAL ET AL　　　2,392,370
ELECTRIC DISCHARGE MEANS FOR CONTROLLING POSITION
Filed Nov. 10, 1942　　　2 Sheets-Sheet 1
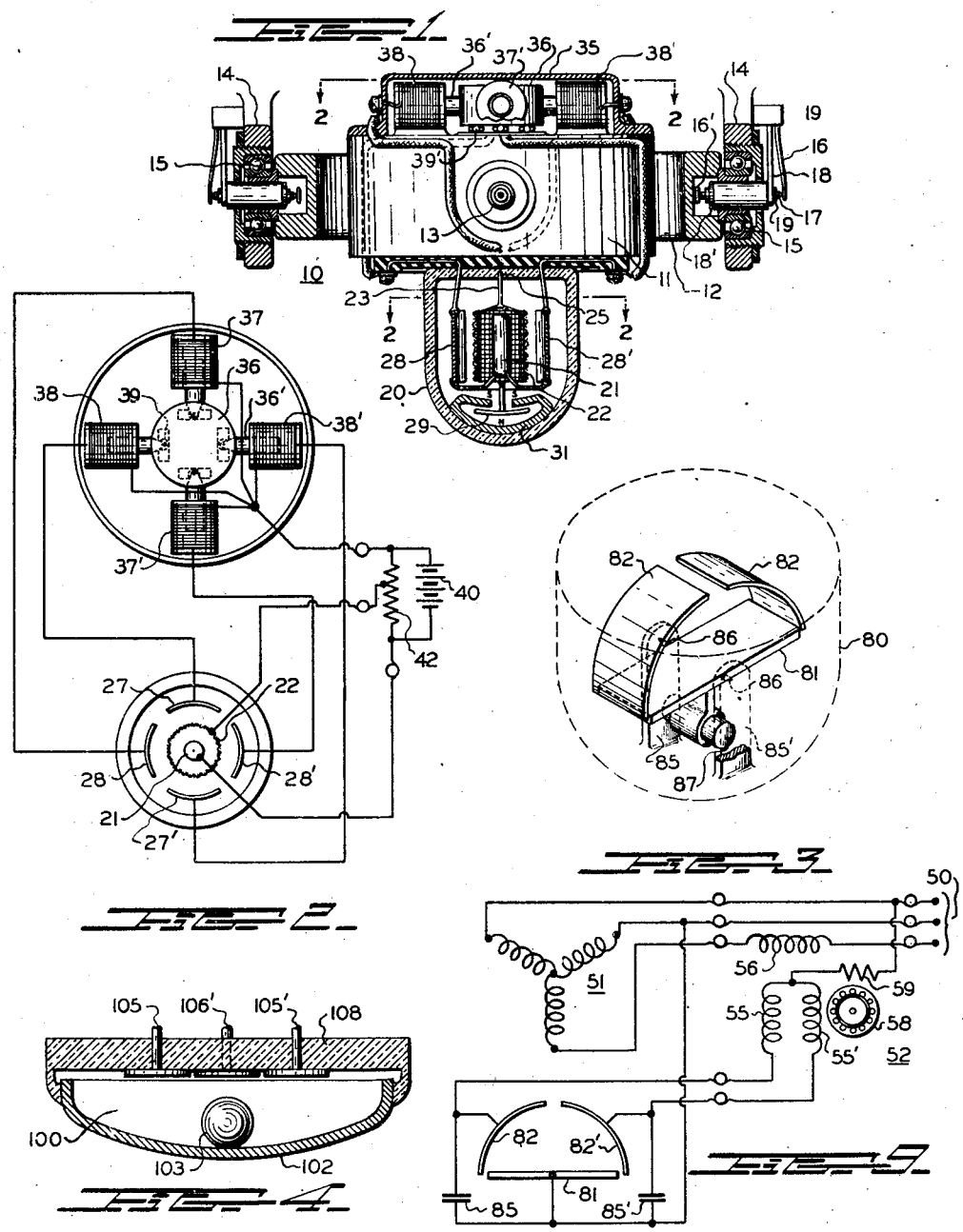
INVENTORS,
ORLAND E. ESVAL, and
ROBERT S. CURRY Jr.;
BY
Herbert H. Thompson
THEIR ATTORNEY.

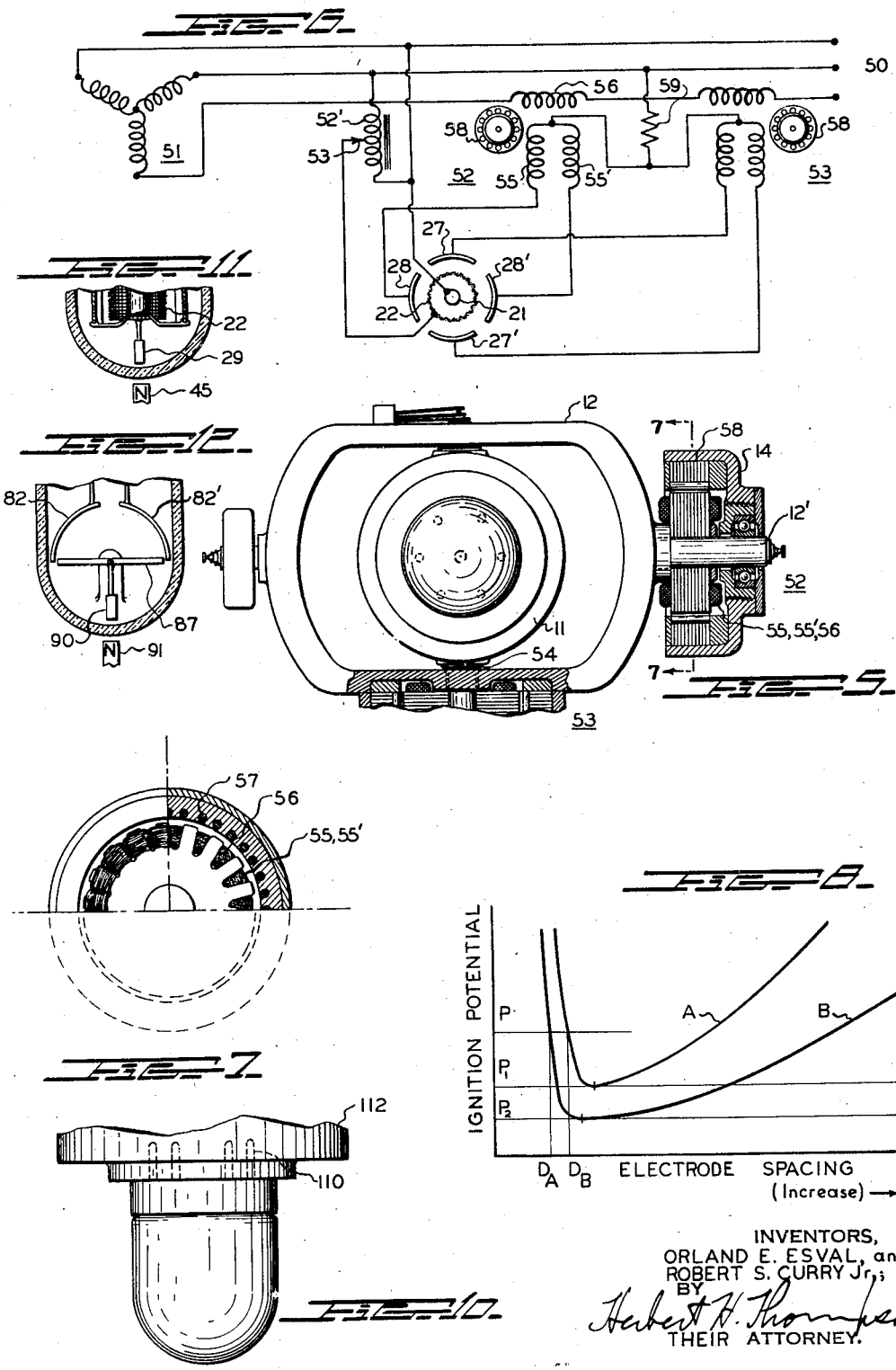

Patented Jan. 8, 1946

2,392,370

UNITED STATES PATENT OFFICE 2,392,370

ELECTRIC DISCHARGE MEANS FOR CONTROLLING POSITION

Orland E. Esval, Huntington, and Robert S. Curry, Jr., Baldwin, N. Y., assignors to Sperry Gyroscope Company, Inc., Brooklyn, N. Y., a corporation of New York Application November 10, 1942, Serial No. 465,102

4 Claims. (Cl. 250—27.5)

This invention relates generally to means for detecting departure of an axis of a body from a reference position and for correcting such departure. The invention in certain of its embodiments has reference more particularly to means for erecting gyro verticals or other gyroscopic instruments mounted on an unstable support, such as an aircraft, although, obviously, similar means may serve to stabilize or control a wide variety of objects.

Heretofore in erecting gyroscopes it has been common to employ air under pressure which is caused to flow through orifices controlled by pendulous shutters or other gravity responsive means normally closing or partially closing the orifices and differentially changing the effective areas thereof in response to departure of the gyroscope axis from a vertical position, to apply a corrective torque to the gyroscope. The use of air for this purpose has certain drawbacks and a supply of air under pressure is not always available, particularly in the case of electrically driven gyroscopes, making it necessary in such cases to have an auxiliary air supply or to have resort to the mounting of an air impeller on the gyro. Also, owing to friction in the shutter bearings, the pneumatic type of erection means does not respond to very small changes of tilt and hence is not as sensitive as might be desired. Further disadvantages of conventional air erection means are the delicate assembly of the controlling shutters and the possibility of clogging of the orifices.

According to the present invention departure of an axis of the gyro from the vertical (for example, the spinning axis in the case of an artificial horizon or gyro vertical) is detected by a change in the character of an electric discharge, either in a vacuum or in a rarified gas, which is utilized to control electrically operated means for precessing the gyro in a direction to return the axis to a vertical position. The discharge means for detecting departure from the vertical may in certain embodiments of the invention comprise a structure similar to that of a thermionic amplifying tube in which a control electrode, for example, a grid, is made a pendulous element suspended to permit free deflection from a normal position, relative to the other electrodes, responsive to tilt. The change of spacing of the electrodes resulting from displacement of a control grid, as is known, causes a change of the amplification factor and mutual conductance of a thermionic tube as well as a change of steady plate current. Either the change of plate current may be utilized as a controlling factor or by applying an alternating potential input to such a device the change of amplified output resulting from change of a characteristic of the tube may be utilized as a control impulse or signal to actuate precessing means.

The axis or axes about which a precessing torque should be applied to correct tilt in a given plane is determined by resolving the control electrode displacement, from its central position, into components along chosen axes, which may be accomplished by the provision of a plurality of pairs of angularly spaced anodes, the electron flow to each of which is controlled by a common pendulous grid or other control electrode.

Instead of an electron discharge in a vacuum, erection means according to the invention may make use of a discharge in a gas under low pressure, such as neon or helium, in which case the initiation of the discharge or ionization of the gas may provide a direct switching action or advantage may be taken of other characteristics of the discharge such as change of the potential gradient with change of electrode spacing, as will be further discussed. Also, instead of resolving tilt into components about different axes by obtaining a plurality of outputs from a single detecting device, component signals may be generated by independent discharge devices each responding by change of output to rotation about a single axis.

The electric tilt or displacement detecting means of the invention provides a sensitive, frictionless, and inertialess, means for controlling the precession of a gyro to a vertical position which dispenses with an air supply, and in the case of an electrically driven gyro, one which may be operated from the same alternating current supply used to spin the gyro itself.

While, by way of example, the application of the invention to gyro verticals has been mentioned further application to gyroscopic instruments will be found in the leveling of directional gyros so that such instruments may furnish a true azimuth indication, or indication in a horizontal plane, and to the control of unstable bodies in general.

It is therefore one object of the invention to provide means controlled by an electric discharge between spaced electrodes to maintain an axis of an unstable body in a reference position, for example, vertical.

Another object is to control the position of a body in accordance with the character of an electric discharge between electrodes mounted on the body and under the influence of a force field due to a source external thereto.

Another object is to provide erection or leveling means for a gyroscopic instrument governed by variation of the character of an electric discharge in an evacuated chamber in response to change of electrode spacing resulting from tilt of the instrument.

Another object is to provide gravity responsive means for varying the spacing of electrodes in a thermionic amplifying tube to vary the amplification factor or mutual conductance of the tube.

Another object is to vary the spacing of electrodes within the evacuated chamber of an electric discharge device by means of a force field, including gravitational, magnetic and electrostatic fields.

Another object is to control an electric discharge through a rarified gas by gravity responsive means to detect tilt of an axis of an unstable body.

Another object is to provide erection means for a gyro vertical actuated by variation of an electrical discharge resulting from change of spacing of electrodes under the control of gravity responsive means mounted on the gyroscope.

Still another object is to provide means for maintaining an axis of an unstable object in a chosen direction by means controlled by variation of the mutual conductance of thermionic amplifying means in response to departure of said axis from said direction.

Other objects and advantages will become apparent from the specification, taken in connection with the accompanying drawings wherein the invention is embodied in concrete form.

In the drawings,

Fig. 1 is an elevation, partly in section, of a gyro vertical comprising electronic erection means in accordance with the invention.

Fig. 2 is a wiring diagram of the erection means of Fig. 1, showing the precessing means of Fig. 1 as a section along the line 2—2 and the sensitive element of Fig. 1 as a section along the line 2'—2'.

Fig. 3 is a perspective view of gaseous discharge tilt or displacement detection means according to the invention, operative about a single axis.

Fig. 4 is a sectional elevation of gaseous discharge tilt detection means operative about a plurality of axes.

Fig. 5 is a plan view, partly in section, of a gyro vertical generally similar to that of Fig. 1 with modified precessing means.

Fig. 6 is a wiring diagram of a modification of the circuit of Fig. 2 employing the precessing means of Fig. 5.

Fig. 7 is a detail of the precessing means of Fig. 5, shown partly in section along the line 7—7 of Fig. 5.

Fig. 8 is a diagram for purposes of explanation.

Fig. 9 is a wiring diagram of the erection or leveling means of Fig. 3.

Fig. 10 illustrates a modified form of mounting for the sensitive element of Fig. 1.

Fig. 11 is a modified detail of Fig. 1.

Fig. 12 is a modification of Fig. 3.

Referring now particularly to Fig. 1, reference numeral 10 is applied generally to a gyro vertical having a rotor bearing frame 11 mounting a rotor (not seen) spinning about a normally vertical axis. Bearing frame 11 is mounted in a gimbal suspension comprising a ring 12 on which frame 11 is pivoted about a first axis in antifriction bearings (a single pivot 13, only, being seen in the figure). Ring 12 is in turn pivoted on the housing 14 of the instrument by antifriction bearings 15 about an axis perpendicular to the axis of pivot or pivots 13. The gyro, of the electrically driven type, is rotated by a motor winding or windings supplied with current over the gimbal pivot points.

This current may be introduced to the motor winding (and to the tilt detecting device) by way of flexible leads. A preferred means, however, is illustrated in connection with gimbal bearings 15 and comprises, as one conducting path across one of said bearings, a leaf spring 16, mounted on housing 14, pressing against the outer pointed end of a central conducting member 17 against the inner pointed end of which presses a second spring 16' mounted on ring 12. A second conducting path over the same gimbal point may comprise a bifurcated spring 18, mounted on housing 14, bearing tangentially near the outer end on conducting sleeve 19 coaxial with but insulated from member 17 and a similar bifurcated spring 18' mounted on the ring and bearing on sleeve 19 near the inner end thereof. The pressure of the springs may be very small if suitable materials are used so that little friction is introduced thereby. Evidently additional conducting paths over the same gimbal point may be provided by additional insulated conducting sleeves and associated spring members. Also it will be apparent that similar arrangements may be used to conduct current across the other bearing 15 mounting ring 12 on housing 14 and across the bearings mounting rotor bearing frame 11 on ring 12.

Attached to and dependent from rotor bearing frame 11 is an evacuated capsule 20 having a glass or metal envelope and containing electrodes generally similar to those of a thermionic amplifying tube. These electrodes include a centrally located cathode 21 preferably having an electron emitting coating and heated to emit electrons by known means not shown. Normally coaxial with cathode 21 is a cylindrical control grid 22 suspended by a fine wire suspension 23 to have a pivot point at 25. The diameter of wire 23 is greatly exaggerated in the figure to make the suspension visible. Four cylindrically formed anodes 27, 27' and 28, 28', better seen in Fig. 2, surround grid 22 and are coaxial with cathode 21. The pendulousness of grid 22 is increased by a member or mass 29 preferably in the form of a conducting spherical disc having the center thereof below pivot point 25. Disc 29, upon displacement of grid 22, moves adjacent to but out of contact with a permanent magnet 31.

This magnet is in the form of a hollow body having an opening in its upper surface to admit the member supporting mass 29 from grid 22 and magnetized to have its lower surface of one magnetic polarity, as indicated by the letter N, and its upper surface of the opposite polarity, as indicated by the letter S, so that in whatever direction conducting member 29 moves from its central position it will cut a strong magnetic field and hence induce eddy currents to damp its motion. One of the elements of the described damping couple may be considered as a part of a pendent member in the envelope which also includes an electrode such as grid 22 in this form of the invention.

Mounted on the top of rotor housing 11 is a casing 35 in which is located precessing means comprising a cylindrical member 36 of substantial mass, displaceable along perpendicular axes under the influence of two pairs of oppositely acting solenoids 37, 37' and 38, 38', which cooperate with four armatures or plungers 36' extending radially from member 36 and guided in the solenoid spools. Plungers 36' are joined to member 36 through a slot and roller construction 39 to permit displacement of member 36 along the two axes of the solenoids. Preferably member 36 is supported by anti-friction means, illustrated as balls 39'.

Referring to the wiring diagram of Fig. 2, operating current for the solenoids is supplied from a battery 40. The circuit of each solenoid includes one of the four paths in evacuated capsule 20 between the common cathode 21 and anodes or plates 27, 27', 28, 28', each solenoid winding being connected in series with a cathode-anode path generally perpendicular to the axis thereof. For example, solenoid 38 having a horizontal axis, as seen in Fig. 2, is connected in series with the vertically appearing cathode-anode path between electrodes 21 and 27. The flow of current in each cathode-anode path is controlled by grid 22, biased negatively, by a portion of the potential drop across potential dividing resistance 42, connected across battery 40.

The four anodes preferably lie on lines parallel to the gimbal axes. In its normal position grid 22 is coaxial with cathode 21 and the anodes and direct current of the same value then flows in each of the cathode-anode paths, resulting in equal pulls on each of plungers 36' and the centering of mass 36 on the gyro spin axis. Upon drift of the spin axis of the gyro from a vertical position, however, grid 22 may be considered to swing away from its central position relative to the non-pendulous electrodes and thereby cause changes in the steady currents in the four anode circuits due to the relative change of spacing of anodes and grid from the cathode.

It will be apparent that any such relative displacement of grid 22 may be resolved into components along the axes along which anodes 27, 27' and 28, 28' lie and that each component displacement results in a differential change in the electron flow to the anodes (plate current) along the axis thereof. Thus, a relative shift of grid 22 to the left, corresponding to a counterclockwise drift of the gyro spin axis in the vertical plane of Fig. 1 results in an increase in the current in the circuit of anode 28 and a decrease in the current in the circuit of anode 28'. The pulls of solenoids 37, 37' on their respective plungers are thereby differentially changed causing member 36 to be shifted toward solenoid 37 and producing a torque about the gimbal axes parallel to that of solenoids 38, 38', resulting in precession of the gyro about the perpendicular gimbal axes which, by proper circuit connections, may be caused to be in a sense to correct or cancel the drift of the spin axis.

The effect of a component shift of grid 22 along the axis of anodes 27, 27' may readily be traced in the light of the above remarks. There is thus provided a means for resolving any tilt of the vertical gyro axis into rectangular components along the gimbal axes and for applying proportional torques about the proper axes and in the proper senses to effect independent cancellation of said components. It will be appreciated by those skilled in the art of vacuum tubes that a very slight change in electrode spacing resulting from displacement of grid 22 may cause a large change in the steady anode or plate current and thereby result in a very sensitive erection control.

While the pendulous control member has been described as the grid in a triode type of electrode assembly it will be obvious that other known assemblies of electrodes may be utilized and that another or other electrodes may be the pendulous control member or members. For example, grid 22 may be rigidly attached to the rotor bearing frame 11 while the assembly of anodes 27, 27', 28, 28' may be the pendulous member. Furthermore, upon consideration it will be seen that the description of the sensitive element as a gravity responsive device refers to only one type of force field which may be used to exert a controlling influence upon an electrode in an evacuated chamber. The invention contemplates and comprises the use of other force fields. A modification of the structure of Fig. 1 is shown in Fig. 11 in which a displaceable electrode is controlled by a magnetic field. In Fig. 11 the member 29', dependent from grid 22 (corresponding to member 29 of Fig. 1), is of ferro-magnetic material either of high or low retentivity, that is, a permanent or temporary magnet, and therefore its position and that of the grid structure of which it is a part is determined by the field of magnet 45 and may be varied by varying the position of the magnet. Magnet 45 may be replaced by an equivalent electromagnet.

Another force field available for control purposes is the electrostatic field, that is, for example, by oppositely charging control members corresponding to members 29' and 45 an electrostatic field may be set up through the medium of which the member within the evacuated chamber may be positioned in accordance with the position of the external member. The charging of the internal member may be by induction from the external member.

Figs. 5 and 7 illustrate another means for exerting a precessing torque under the control of the sensitive tilt detecting device of Fig. 1, in the form of a two phase torque motor mounted on an axis of the gimbal suspension perpendicular to that about which precession is controlled. Reference numeral 52 is applied generally to the torque motor mounted on the axis about which ring 12 swivels. Such a motor may have a construction similar to that of a two phase induction motor with a squirrel cage inductor. For convenience the squirrel cage 58 is made the stator, and the windings are on the rotor, the stator being mounted on the instrument case and the rotor on one of the pivot shafts 12' extending from ring 12. To secure reversible operation, there are provided on the rotor a pair of windings 55, 55', oppositely poled, constituting one motor phase (the two windings acting differentially) and a third winding 56 electrically spaced 90° from said first two windings and constituting the second motor phase. Windings 55 and 55' may, in practice, take the form of a continuous winding with a center tap. It is preferable with an even number of rotor winding slots to use an odd number of inductor bars 57 in the squirrel cage to minimize slot lock. Current to the rotor windings may be supplied by contact spring arrangements such as have been described in connection with Fig. 1.

A second torque motor 53, similar to motor 52, is provided having a rotor mounted on an extension of the shaft pivoting rotor bearing frame 11 on ring 12.

In the wiring diagram of Fig. 6 a circuit for controlling torque motors 52 and 53 by the tilt detecting device of Fig. 1 is illustrated. In this arrangement the tilt detecting device acts as an amplifier of a constant magnitude alternating potential input signal to supply normally equal currents to the oppositely acting windings constituting the reversible phase of the torque motor, this balanced condition being upset upon tilt of the gyro. The source of power in this arrangement may be the three-phase line 50 which supplies driving power for the motive means spinning the gyro rotor, this motive means being here illustrated as having a three-phase Y connected winding 51. Connection from one phase of line 50 is made to a voltage dividing device shown as reactor 52' from which an alternating potential of adjustable magnitude and phase, determined by the position of adjustable contact 53, may be derived. This voltage is applied between cathode 21 and grid 22. Anode circuit potentials are derived, preferably, from the same phase of supply line 50 from which the grid potential is taken. Independent phase adjusting means (not shown) may be used in connection with the anode supply or separate phase and magnitude adjustments may be employed for the input. Oppositely positioned anodes 28, 28' are connected to oppositely acting rotor windings 55, 55', respectively, of torque motor 52 while oppositely positioned anodes 27, 27' are similarly connected to the oppositely acting windings of motor 53. Winding 56, constituting the non-reversible phase of torque motor 52 is connected in series with the corresponding winding of motor 52 for constant excitation from supply 50. A resistance 59 is common to the four anode circuits and serves to limit the plate currents.

Considering the operation of torque motor 52, the alternating currents through windings 55 and 55' are normally equal but upon the occurrence of a component of tilt of the gyroscope in the plane of anodes 28, 28' these currents are differentially varied, due to the relative shift of grid 22 toward one of anodes 28, 28' and away from the other, to cause a differential change of the currents in windings 55, 55'. The net alternating field of these two windings, resulting from unbalance of the currents therein, in combination with the constant alternating field of winding 56 produces a rotating field which reacts with squirrel cage 58 to produce a torque proportional to tilt in one direction or the other about the axis of bearings 15 and thereby cause precession of the gyro about the perpendicular axis of bearings or pivots 13 to return the spinning axis of the gyro to the vertical.

The operation of torque motor 53 to produce a torque about the axis of bearings 13 responsive to a component tilt of the gyro in the plane through the centers of anodes 27, 27', thereby to cause precession about the axis of bearings 15 will be apparent from the described operation of motor 52.

Instead of utilizing the characteristics of an electron discharge in a vacuum, as in the device of Fig. 1, the characteristics of a discharge through an ionized gas may be used to obtain a control signal for electrically operated precessing or other motive means. One embodiment of this principle, according to the invention, is shown in Fig. 3 which illustrates an evacuated capsule 80 containing gas, such as neon or helium, under low pressure. This capsule is adapted to be attached to an instrument or other object, an axis of which is to be stabilized in a vertical or in a selected direction.

Within the evacuated chamber are a pair of fixed electrodes 82, 82' and a movable electrode 81 having the form of a rectangular plate supported by standards 85 of relatively high conductivity material for rotation about pivots 86. Electrode 81 is made pendulous by a member depending therefrom comprising a cylindrical permanent magnet 87 having the end faces thereof adjacent but out of contact with standards 85, 85' for generating damping eddy currents in the standards upon relative motion of the magnet and standards.

Electrodes 82, 82' are in the form of cylindrically formed plates of equal radius coaxial with the axis of pivots 86. Under normal conditions the ends of plate 81 parallel to the rotational axis thereof are adjacent the respective lower edges of plates 82, 82' but spaced therefrom by a predetermined small radial clearance. When this normal relationship is disturbed, by the relative rotation of plates 82, 82' and plate 81, this radial clearance is preserved between an edge of plate 81 and one of plates 82, 82' but the spacing between the opposite edge of plate 81 and the adjacent one of plates 82, 82' is increased substantially in proportion to the angle of rotation.

Fig. 9 is a wiring diagram illustrating the connection of the device of Fig. 3 to motive means for erecting or otherwise positioning an instrument or platform, here shown as torque motor 52 previously described in connection with the arrangements of Figs. 5, 6 and 7. An alternating potential, as for example derived from one phase of three phase line 50 supplying gyro driving winding 51, is applied between electrode 81 and electrodes 82 and 82' respectively. Winding 55 of the two windings 55, 55' constituting the reversible phase of torque motor 52 is connected in series with electrode 82 while winding 55' is connected in series with electrode 82', current limiting resistance 59 being common to the circuits of the two windings, as hereinbefore described. Between electrodes 81 and 82 a condenser 85 is connected and between electrodes 81 and 82' a condenser 85' of like capacity is connected.

With the described arrangement, and under conditions to be discussed, a discharge between the electrodes 81, 82, 82' may occur and be maintained by the ionization of the gas within the capsule. The discharge is alternating in character, electrode 81, for example serving as anode during one half cycle and as cathode during the succeeding half cycle. This discharge occurs when the electrodes are cold and hence no means for heating an electrode or leads for supplying heating current thereto are required, such as are required in the arrangement of Fig. 1.

The minimum voltage necessary for initiating a discharge depends among other factors upon the kind of gas, the purity and pressure of the gas and spacing of the electrodes. The lower the pressure, within certain limits, the lower the voltage required to cause a discharge because of the more frequent ionization of the gas molecules resulting from the greater mean free path of the electrons. At very low pressures, however, owing to reduced number of gas molecules, the voltage required to start a discharge increases rapidly.

These relationships are shown in Fig. 8 where curves of variation of ignition or minimum starting potential with variation of electrode spacing are drawn. Curve A may represent conditions when the discharge occurs in a substantially pure gas, for example, neon or helium, while curve B may represent conditions for discharge in a contaminated gas, for example, in a mixture of neon or helium with ½ to 1 per cent of argon. It is seen that in each case there is a minimum potential, $P_1$ and $P_2$, below which a discharge cannot start regardless of the electrode spacing and that for a given applied potential there is a minimum electrode spacing below which a discharge cannot occur. Therefore, if the applied voltage is that represented by the ordinate P in the diagram, a discharge cannot occur at a smaller electrode spacing than $D_A$ in the case of the pure gas or $D_B$ in the case of the mixture.

Returning to the arrangement of Fig. 3 the spacing of electrodes 82, 82′ from electrode 81 under normal conditions is made too small to permit a discharge occurring. Upon tilt of the instrument or platform to which capsule 80 is attached, for example, in a clockwise direction about the axis of pivots 86, the spacing of electrodes 81, 82 increases and a discharge occurs which allows current to flow in winding 55 of torque motor 52. Since the spacing of electrodes 81, 82′ does not change (for tilt in the assumed direction) no current flows in winding 55′. Upon tilt in a counter-clockwise direction, as seen in the figure, a discharge occurs between electrodes 81, 82′ and current flows in winding 55′ thus providing a means for reversing the direction of the torque applied by motor 52. Condensers 85 and 85′ improve the operating efficiency of the torque motor control circuit by advancing the phase of the current and increasing the current passed per cycle of the supply voltage. Without the condensers the control current would be of the nature of short pulses having a magnitude determined by the inductance of the circuit. Electrodes 81, 82, 82′ may be of nickel, preferably coated with caesium or other material which emits electrons readily.

A device for detecting tilt about a single axis, such as has just been described would find utility, among other applications, in maintaining a directional gyro, of conventional construction, level. It will be apparent, however, that two devices of the construction of Fig. 3 may be used to detect tilt about different axes and to control independent torque motors, in a manner similar to that illustrated in Fig. 6, to precess a gyro or to operate other types of motive means where the precessing of a gyro is not concerned.

Fig. 12 illustrates a modification of the invention similar to that of Fig. 3 in which instead of employing a pendulous element to maintain electrode 81 horizontal a magnetic member 90 is attached to electrode 81 (shown as a permanent magnet although soft iron may be employed) which is attracted (or repelled) by an external magnet 91 to position electrode 81 angularly and thus control the discharges between electrode 81 and electrodes 82, 82′. Instead of a separate magnet, damping magnet 87 may serve as the controlled member or electrode 81 may itself be a magnet or composed of ferro-magnetic material. There is thus provided non-contacting means for obtaining a signal or signals of reversible character responsive to relative displacement of a pair of members, one on which the evacuated chamber containing the electrodes is mounted and the other the member on which magnet 91 is mounted. To those skilled in the electric arts it will be obvious that analogous arrangements may be provided to position member 81 through the medium of an electrostatic field by substituting a charged body for member 91 and for member 90 a body capable of receiving and retaining an induced charge.

Fig. 4 illustrates another cold electrode gaseous discharge tilt detecting device, according to the invention, which is adapted to provide output signals responsive to component tilts about a pair of coordinate axes. Evacuated chamber 100 containing gas under low pressure has the lower portion of its envelope in the form of a dished circular metallic member 102, concave upward, which supports a freely displaceable metallic ball 103. A pair of electrodes 105, 105′, symmetrically spaced about the central axis of the device, are supported by an insulating portion 108 of the envelope of chamber 100 along one axis while another pair of electrodes, of which rear electrode 106′ only is seen, is similarly spaced on a perpendicular axis.

In operation, if the device of Fig. 4 is supported, for example, from the gyro rotor bearing frame 11 of Fig. 1, with the fixed electrodes in a horizontal plane, ball 103 will roll to the lowest point of the inner surface of member 102 where it will be symmetrically positioned with respect to the four fixed electrodes and therefore equally spaced therefrom. Upon tilt of the gyro ball 103 will roll in a direction determined by the direction of the tilt, and its displacement will in general have components along the two axes on which the two pairs of fixed electrodes lie, thereby increasing the spacing between the ball and one electrode of each pair and decreasing the spacing between the ball and the other electrode of each pair.

Considering first displacement along the axis of electrodes 105, 105′, it will be seen by reference to Fig. 9 that if ball 103, through its contact with member 102, is made a common electrode corresponding to electrode 81 and electrodes 105, 105′ are connected in circuit as are electrodes 82, 82′, and if the normal spacing of ball 103 and the four fixed electrodes is slightly less than the minimum necessary to start a discharge, then clockwise tilt of the device of Fig. 4 about an axis perpendicular to that of electrodes 105, 105′ from its normally horizontal position will cause a discharge between ball 103 and fixed electrode 105′ due to the increased spacing of these electrodes but that no discharge to electrode 105′ can occur. Similarly counter-clockwise rotation, by increasing the spacing between ball 103 and electrode 105, will cause a discharge between these electrodes.

By the use of the circuit of Fig. 3 oppositely controlling impulses may thus be produced to govern the operation of a torque motor or other motive or force applying means. The manner in which similar operation responsive to tilt about the axis of electrodes 105, 105′ may be obtained will be obvious.

For convenience the evacuated capsule of any of the devices described above may be provided with quick detachable mounting means such as are commonly employed in connection with electron tubes. Such mounting means are shown in Fig. 10 in the form of a base for the tilt detecting device having a number of connecting prongs 110 suitable for the number of connections involved and a connector socket 112 for receiving said prongs and adapted for permanent attachment to the controlled instrument or support.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electronic tilt detector comprising a sealed envelope adapted to be mounted in a vertical position, a plurality of electrodes and a damping couple therein, one of said electrodes being pendulously suspended in said envelope and normally defining the vertical axis thereof, one element of said damping couple being connected to said electrode, and the other electrodes and other damping element being concentrically mounted in said envelope with respect to said axis.

2. An electronic tilt detector as claimed in claim 1, in which said electrodes comprise a plurality of fixed anodes, a fixed cathode and a pendulously suspended grid.

3. An electronic tilt detector as claimed in claim 1, in which said electrodes comprise an anode, a cathode and a grid, and in which the anode comprises four segmental plates symmetrically mounted about said vertical axis, whereby a distinctive output is obtained for tilt in any direction.

4. An electronic tilt detector of the triode type, comprising a sealed envelope adapted to be mounted in a vertical position, a hollow grid pendulously suspended in said envelope and normally defining the vertical axis thereof, a cathode positioned within the grid along said axis, and an anode comprising a plurality of segmental plates surrounding said grid and symmetrically placed about said vertical axis, and an output lead for each plate whereby the output of the tube is responsive to tilt in any direction.

ORLAND E. ESVAL.
ROBERT S. CURRY, Jr.